(12) United States Patent
Rechenbach et al.

(10) Patent No.: US 10,960,749 B2
(45) Date of Patent: Mar. 30, 2021

(54) POWER-SPLIT TRANSMISSION

(71) Applicant: ZF Friedrichshafen AG, Friedrichshafen (DE)

(72) Inventors: Philipp Rechenbach, Markdorf (DE); Stefan Beck, Eriskirch (DE); Viktor Warth, Friedrichshafen (DE); Johannes Kaltenbach, Friedrichshafen (DE); Raphael Himmelsbach, Friedrichshafen (DE); Benedikt Reick, Friedrichshafen (DE); Michael Wechs, Weissensberg (DE); Jens Moraw, Markdorf (DE); Gerhard Niederbrucker, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/542,528

(22) Filed: Aug. 16, 2019

(65) Prior Publication Data

US 2020/0055385 A1 Feb. 20, 2020

(30) Foreign Application Priority Data

Aug. 17, 2018 (DE) .................. 10 2018 213 870

(51) Int. Cl.
| | |
|---|---|
| *B60K 6/365* | (2007.10) |
| *B60K 6/442* | (2007.10) |
| *F16H 3/62* | (2006.01) |
| *B60K 6/547* | (2007.10) |
| *B60K 17/28* | (2006.01) |
| *B60K 6/48* | (2007.10) |

(52) U.S. Cl.
CPC .............. *B60K 6/365* (2013.01); *B60K 6/442* (2013.01); *B60K 6/547* (2013.01); *F16H 3/62* (2013.01); *B60K 17/28* (2013.01); *B60K 2006/4825* (2013.01)

(58) Field of Classification Search
CPC ........ B60K 6/365; B60K 6/442; B60K 6/547; B60K 2006/4825; B60K 17/28; F16H 3/62; F16H 3/724; F16H 3/727
See application file for complete search history.

(56) References Cited

U.S. PATENT DOCUMENTS

2016/0257189 A1* 9/2016 Hata ....................... F16H 3/728
2017/0274754 A1* 9/2017 Imamura ................ B60K 6/365

FOREIGN PATENT DOCUMENTS

CN 104 494 415 A 4/2015

* cited by examiner

*Primary Examiner* — Huan Le
(74) *Attorney, Agent, or Firm* — Davis & Bujold PLLC; Michael J. Bujold

(57) ABSTRACT

A power-split transmission comprises an electric variator (9) and an electric variator (10) which can be connected, by way of a clutch (8), for forward driving, and a clutch (7), for reverse driving, to the drive output shaft (5) in such manner that the drive output shaft (5) can be purely electrically driven even when the input shaft (2) is static.

9 Claims, 3 Drawing Sheets

POWER-SPLIT TRANSMISSION

This application claims priority from German patent application Ser. No. 10 2018 213 870.2 filed Aug. 17, 2018.

FIELD OF THE INVENTION

The invention relates to a power-split.

BACKGROUND OF THE INVENTION

Power-split transmissions of this type can be driven by an internal combustion engine and comprise a first electric variator and a second electric variator. Between the internal combustion engine and the power-split transmission a clutch is often arranged in order to be able to drive the vehicle even without the internal combustion engine.

In this context the term variator is understood to mean a variator machine.

CN 1 04 494 415 B discloses a power-split transmission with a clutch between the internal combustion engine and the power-split transmission, wherein the power-split transmission comprises a first electric variator and a second electric variator. The clutch enables the vehicle to be driven purely electrically.

SUMMARY OF THE INVENTION

The purpose of the present invention is to provide a power-split transmission that enables purely electric driving, which is of simple construction and which has high efficiency.

This objective is achieved with a power-split transmission of the type concerned which also embodies the characteristics specified in the principal claim.

According to the invention, the power-split transmission comprises a first electric variator and a second electric variator, which are permanently connected to planetary gearsets in order to drive the output shaft of the power-split transmission even without the internal combustion engine, when at least one of the electric variators is supplied with electrical energy. The internal combustion engine is permanently connected to the input shaft of the power-split transmission. In turn, the input shaft is functionally connected to a clutch for forward driving and a clutch for driving in reverse. If the clutch for forward driving and the clutch for reverse driving are actuated in the opening direction, so that no torque can be transmitted by the clutches, then the output shaft of the power-split transmission can be driven purely electrically. For this the power-split transmission draws electrical energy from an energy accumulator or a static energy network. If the clutch for forward driving or the clutch for reverse driving is actuated in the closing direction so that torque is transmitted, the internal combustion engine can drive the power-split transmission whereby one electric variator works as a generator and one electric variator works as a motor. In the event that electrical power is delivered to an attached device, the possibility exists that during driving, i.e., while the vehicle is being driven by the internal combustion engine, both electric variators are operated as generators. The planetary gearsets are functionally connected to further clutches by way of which driving ranges can be engaged. Thus, by way of the clutch for forward driving and the clutch for reverse driving as many driving ranges can be selected in a forward driving direction as in a reverse driving direction.

BRIEF DESCRIPTION OF THE DRAWINGS

Further characteristics emerge from the description of the figures, which show.

DETAILED DESCRIPTION OF THE PREFERRED EMBODIMENTS

Figure 1:
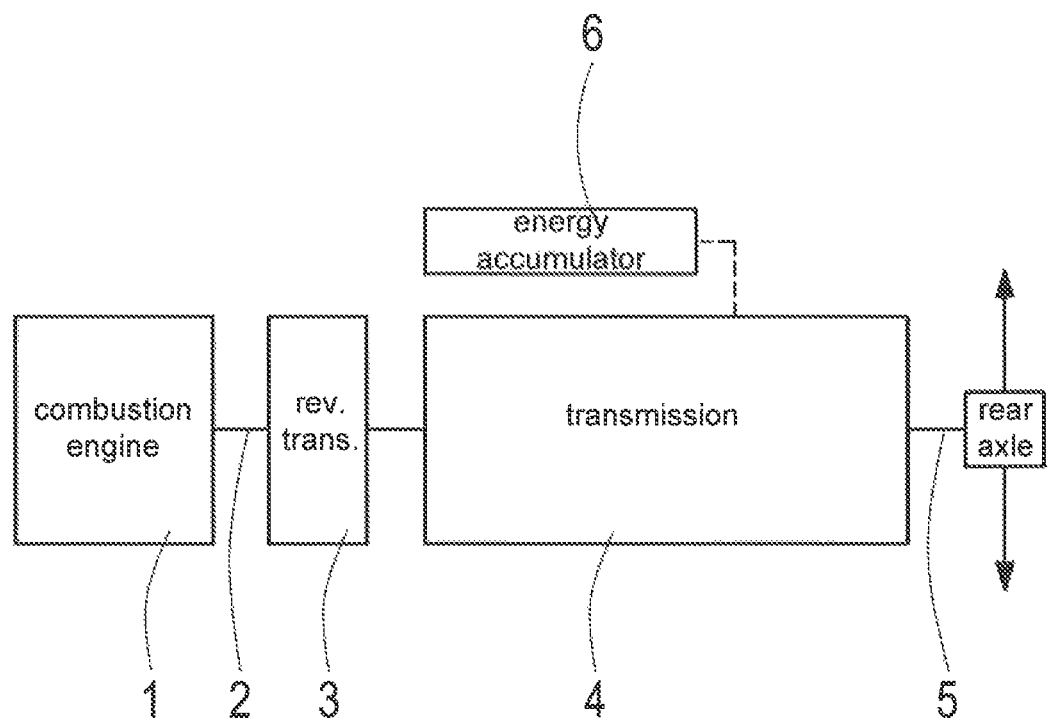
FIG. 1: A diagram of the drive input

FIG. 1:

An internal combustion engine drives the reversing transmission 3 via an input shaft 2. The reversing transmission 3 comprises a clutch for forward driving and a clutch for reverse driving, as well as gearwheels for reversing the direction of rotation. The transmission 4 essentially contains planetary gearsets, clutches and variators, and drives the drive output shaft 5, which for example drives the wheels of a tractor via a rear axle thereof. The transmission 4, in particular its variators, are connected to an electrical energy accumulator 6. If the clutch for forward driving and the clutch for reverse driving in the reversing transmission 3 are open, the drive output shaft 5 can be driven electrically by energy from the energy accumulator 6 even if the internal combustion engine 1 is switched off, without additional clutches having to be present between the internal combustion engine 1 and the power-split transmission and having to be open. Thus, purely electric diving is enabled in a simple manner. By actuating the clutch for forward driving and the clutch for reverse driving in the reversing transmission 3 in their closing direction so that those two clutches are actuated in the closing direction, the vehicle can be secured in the manner of a parking brake.

FIG. 2:

With this embodiment purely electric driving is possible both with the clutch 8 for forward driving and the clutch 7 for reverse driving open, and also with the clutch 8 for forward driving and the clutch 7 for reverse driving closed at the same time.

The input shaft 2, which is connected to the internal combustion engine (not shown), can drive the power-split transmission via the internal combustion engine when either the clutch 8 for forward driving or the clutch 7 for reverse driving is actuated in the closing direction. Then the electric variator 9 works as a generator and the electric variator 10 as a motor. In the case when electric power is delivered to an attached device, the possibility exists that during driving, i.e. when the vehicle is powered by the internal combustion engine, both of the electric variators 9 and 10 operate as generators. If the internal combustion engine is switched off and therefore stops, the input shaft 2 is no longer driven by the internal combustion engine. If now the two clutches, namely the clutch 7 for reverse driving and the clutch 8 for forward driving are actuated in the opening direction, then by virtue of energy from the energy accumulator 6 shown in FIG. 1 the electric variator 9 and/or the electric variator 10 can be supplied with electrical energy, whereby the drive output shaft 5 can be driven. During purely electric driving the possibility exists, depending on the operating point, of operating the electric variator 9 as a motor and at the same time operating the electric variator 10 as a generator, or else the electric variator 10 as a motor and the electric variator 9 as a generator, or indeed operating the electric variator 9 as a motor and at the same time the electric variator 10 as a motor. If the clutch 7 for reverse driving and the clutch 8 for forward driving are both actuated in the dosing direction, so that both can transmit torque, then the electric variator 9 is firmly braked by the clutch 8 for forward driving so that electric driving is only possible by means of the electric variator 10. In that way the electric variator 9 does not have to support any torque and its size is therefore not relevant from the standpoint of pure electric driving, so that the electric variator 9 does not have to be made larger.

By way of the planetary gearset 11, the planetary gearset 12 and the planetary gearset 13 and also the clutches 14, 15, 16, 17 and 18, which latter is designed as a brake, several driving ranges can be engaged. At the other end of the power-split transmission the input shaft 2 forms an auxiliary power takeoff 19, for example a PTO driveshaft for an agricultural vehicle.

Figure 2:
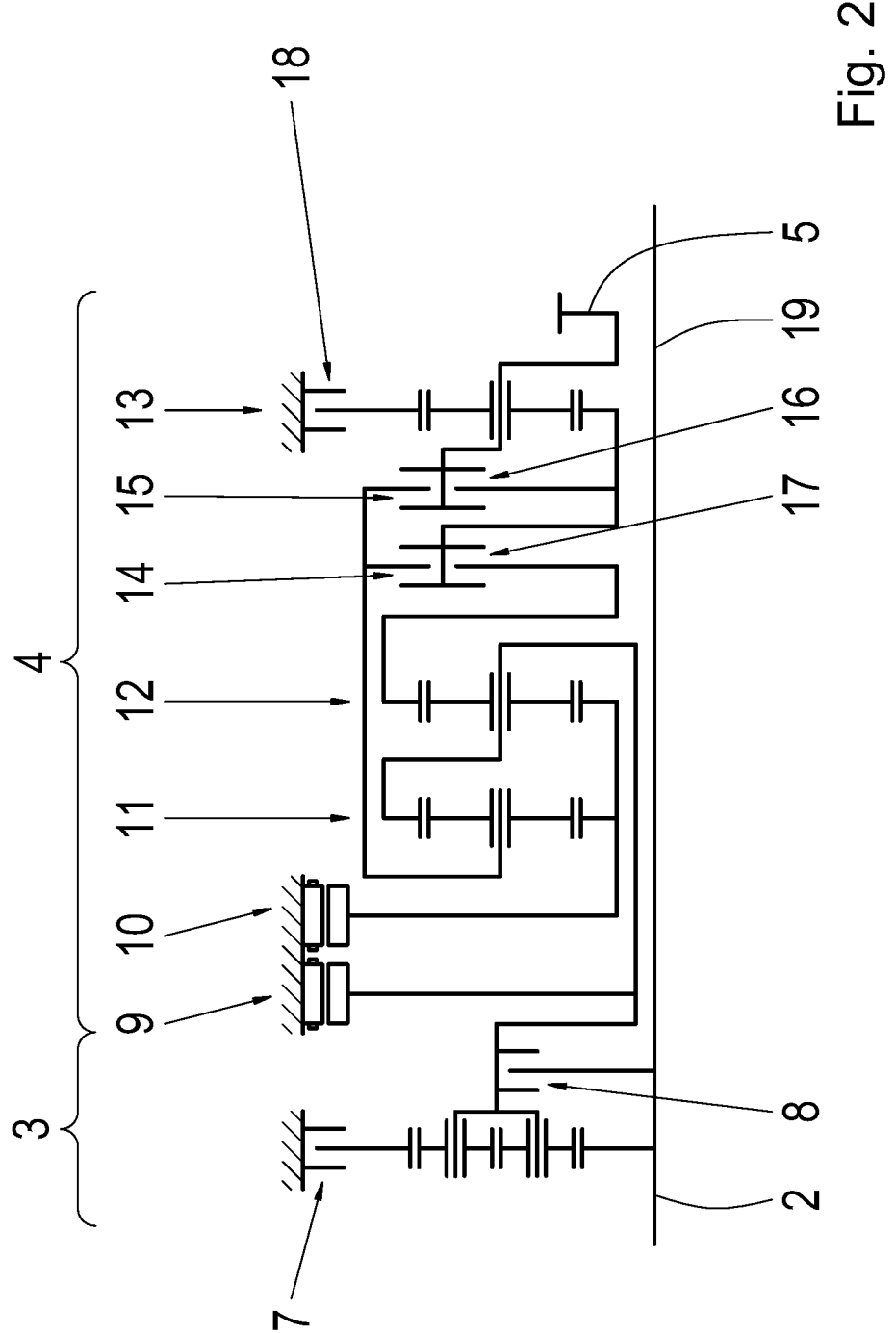
FIG. 2: A first embodiment of the power-split transmission
Figure 3:
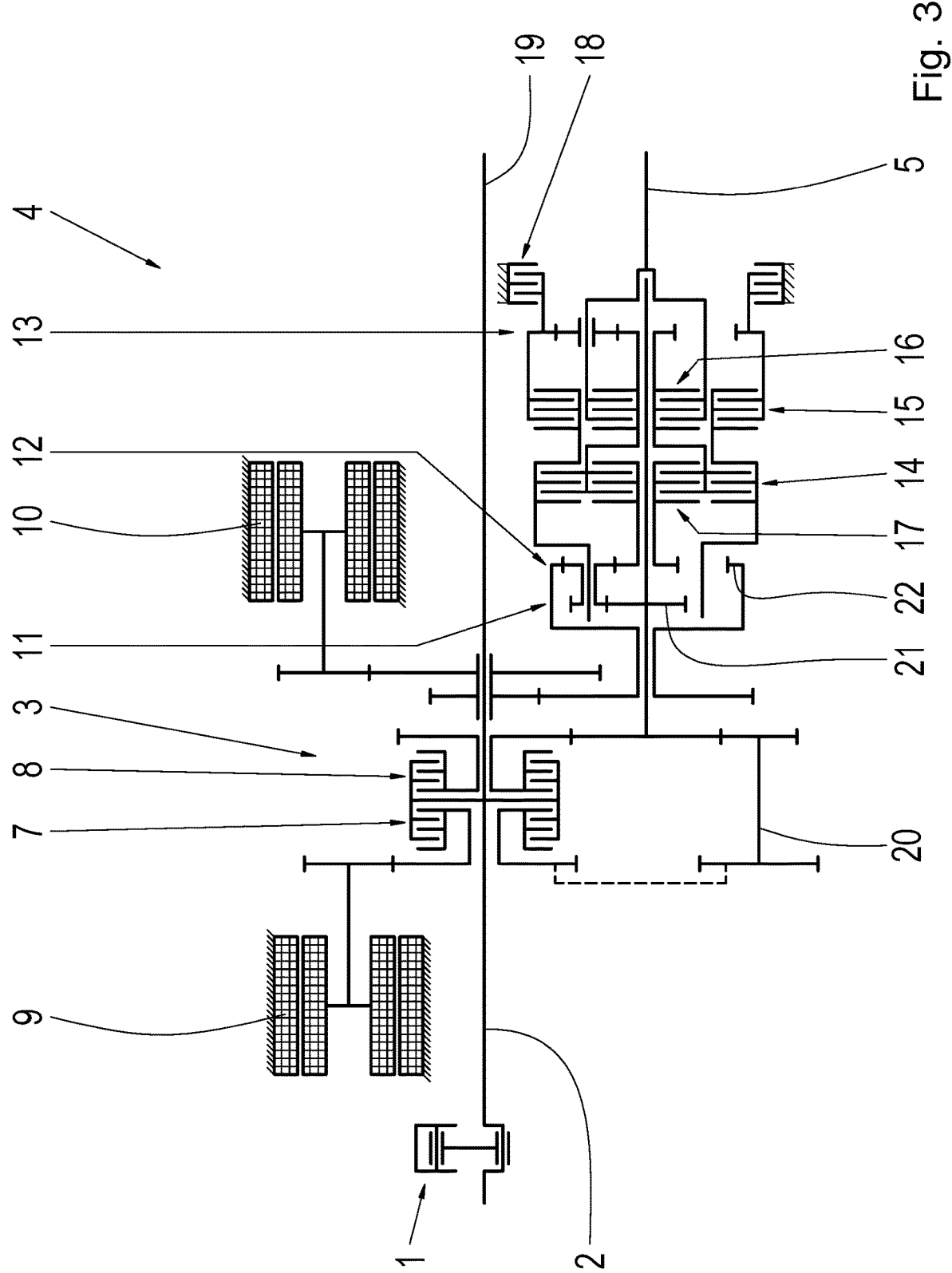
FIG. 3: A second embodiment of the power-split transmission.

FIG. 3:

An internal combustion engine 1 drives the input shaft 2, which at its other end forms an auxiliary power takeoff 19. The input shaft 2 is functionally connected to a clutch 7 for reverse driving and a clutch 8 for forward driving. An electric variator 9 is functionally connected on one side to the clutch 7 for reverse driving and also, by way of the countershaft 20, to the sun gear 21 of the planetary gearset 11. The clutch 8 for forward driving is also connected to the sun gear 21. The variator 10 is functionally connected to the ring gear 22 of the planetary gearset 12. If the clutch 8 for forward driving is actuated in the dosing direction and the clutch 7 for reverse driving is actuated in the opening direction, then by way of the input shaft 2 the internal combustion engine 1 can drive both the variator 9 and the sun gear 21. The variator 9 is electrically connected to the variator 10. Depending on the control of the variator 10 and the switching of the clutches 14, 15, 16 and 17 and the brake 18, the drive output shaft 5 can be driven in one of the driving ranges. By switching over the clutch 7 for reverse driving and the clutch 8 for forward driving, the drive output shaft 5 rotates in the opposite direction. Since the clutch 7 for reverse driving and the clutch 8 for forward driving are both actuated completely in the opening direction, the internal combustion engine 1 can be switched off and the input shaft 2 no longer rotates at any speed. The variator 9 and/or the variator 10 are supplied with electrical energy from the energy accumulator 6 (not shown) and can drive the drive input shaft 5 purely electrically. In this case too, several driving ranges can be engaged by means of the clutches 14, 15, 16, 17 and the brake 18. Both of the variators 9 and 10 are involved in the driving. Since the drive output shaft 5 does not have to be arranged coaxially with the input shaft 2, as is the case for example in FIG. 2, it is possible to use rear axles with a different crown wheel arrangement. Furthermore, the shaft connected to the sun gear 21 can be used for central lubricant supply since that shaft also rotates when the drive output shaft 5 is rotating, even when the internal combustion engine 1 is stopped.

INDEXES

1 Internal combustion engine
2 Input shaft
3 Reversing transmission
4 Transmission
5 Drive output shaft
6 Energy accumulator
7 Clutch for reverse driving
8 Clutch for forward driving
9 Electric variator
10 Electric variator
11 Planetary gearset
12 Planetary gearset
13 Planetary gearset
14 Clutch
15 Clutch
16 Clutch
17 Clutch
18 Brake
19 Auxiliary power takeoff
20 Countershaft
21 Sun gear
22 Ring gear

The invention claimed is:

1. A power-split transmission comprising:
a first electric variator,
a second electric variator,
an input shaft being connectable to an internal combustion engine and to a plurality of planetary gearsets,
the input shaft being connectable to the first electric variator and the input shaft being functionally connected to at least one of the plurality of planetary gearsets,
the second electric variator being functionally connected to at least one of the plurality of planetary gearsets,
a clutch for forward driving,
a clutch for reverse driving,
a drive output shaft for driving vehicle wheels, and
when the clutch, for forward driving, is actuated in a disengaging direction and, at the same time, the clutch for reverse driving is also actuated in the disengaging direction while the input shaft is static, the drive output shaft is drivable if at least one of the first and the second electric variators is supplied with electrical energy,
wherein a plurality of driving ranges are engagable by controlling further clutches, and the further clutches are in functional connection with components of the plurality of planetary gearsets.

2. The power-split transmission according to claim 1, wherein to drive the drive output shaft by way of the internal combustion engine, the first electric variator is functionally connected to the input shaft, since either the clutch for forward driving or the clutch for reverse driving is actuated in an engaging direction.

3. The power-split transmission according to claim 1, wherein the clutch, for forward driving, and the clutch, for reverse driving, both surround the input shaft, that is connectable to the internal combustion engine, and are located upstream of the plurality of planetary gearsets.

4. The power-split transmission according to claim 1, wherein the input shaft extends through the plurality of planetary gearsets.

5. The power-split transmission according to claim 1, wherein the clutch for forward driving and the clutch for reverse driving are arranged coaxially with the input shaft.

6. The power-split transmission according to claim 1, wherein a planetary carrier is connectable to the input shaft by the clutch for forward driving.

7. The power-split transmission according to claim 1, wherein a ring gear is connectable to a transmission housing by the clutch for reverse driving.

8. A power-split transmission comprising:
a first electric variator,
a second electric variator ,
an input shaft being connectable to an internal combustion engine and to at least one of a plurality of planetary gearsets, the input shaft being connectable to the first electric variator, the input shaft being functionally connected to at least one of the plurality of planetary gearsets, the second electric variator being functionally connected to at least one of the plurality of planetary gearsets, a clutch for forward driving, a clutch for reverse driving, a drive output shaft for driving vehicle wheels, and when the clutch for forward driving is actuated in an engaging direction and, at the same time, the clutch for reverse driving is also actuated in the engaging direction while the input shaft is static, the drive output shaft is drivable if at least one of the first and the second electric variators is supplied with electrical energy, wherein a plurality of driving ranges are engagable by controlling further clutches, and the further clutches are in functional connection with components of the plurality of planetary gearsets.

9. A method for operating a power-split transmission having a first electric variator, a second electric variator and an input shaft, which can be connected to an internal combustion engine and to a plurality of planetary gearsets, the input shaft is connectable to the first electric variator and the input shaft is functionally connected to at least one of the plurality of planetary gearsets, and the second electric variator is functionally connected to at least one of the plurality of planetary gearsets, and also having a clutch for forward driving and a clutch for reverse driving and a drive output shaft for driving vehicle wheels, the method comprising:

to operate the power-split transmission when the internal combustion engine is switched off, actuating the clutch for forward driving in an engaging direction, and also actuating the clutch for reverse driving in an engaging direction, and supplying at least one of the first and the second electric variators with electrical energy so that, even with the input shaft static, the drive output shaft is driven, wherein a plurality of driving ranges are engagable by controlling further clutches, and the further clutches are in functional connection with components of the plurality of planetary gearsets.

* * * * *